(12) United States Patent
Liu

(10) Patent No.: US 11,726,362 B1
(45) Date of Patent: Aug. 15, 2023

(54) DISPLAY PANEL COMPRISING A PLURALITY OF PIXEL UNITS DIVIDED INTO ONE FIRST SUB-REGION AND ONE SECOND SUB-REGION BY A TRUNK ELECTRODE, DISPLAY MODULE, AND DISPLAY DEVICE

(71) Applicants: Huizhou China Star Optoelectronics Display Co., Ltd., Huizhou (CN); TCL China Star Optoelectronics Technology Co., Ltd., Shenzhen (CN)

(72) Inventor: Jing Liu, Huizhou (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/897,285

(22) Filed: Aug. 29, 2022

(30) Foreign Application Priority Data

Jul. 28, 2022 (CN) .......................... 202210901001.8

(51) Int. Cl.
*G02F 1/1333* (2006.01)
*G02F 1/1343* (2006.01)
*G02F 1/1335* (2006.01)

(52) U.S. Cl.
CPC .. *G02F 1/133391* (2021.01); *G02F 1/133531* (2021.01); *G02F 1/134336* (2013.01)

(58) Field of Classification Search
CPC ......... G02F 1/133531; G02F 1/133391; G02F 1/136272; G02F 1/136218
See application file for complete search history.

(56) References Cited

U.S. PATENT DOCUMENTS

2003/0193625 A1* 10/2003 Yoshida ............ G02F 1/134336
349/43
2012/0001840 A1 1/2012 Ohgami
2019/0384081 A1* 12/2019 Mori .................. G02F 1/13624

FOREIGN PATENT DOCUMENTS

| CN | 1601357 | 3/2005 |
| CN | 105911776 | 8/2016 |
| CN | 109387982 | 2/2019 |
| CN | 113703231 | 11/2021 |
| CN | 114779541 | 7/2022 |
| WO | WO 2009/101734 | 8/2009 |

OTHER PUBLICATIONS

Notification of Office Action and Search Report dated Mar. 29, 2023 From the State Intellectual Property Office of the People's Republic of China Re. Application No. 202210901001.8 and Its Translation Into English. (17 Pages).

* cited by examiner

*Primary Examiner* — Paul C Lee

(57) ABSTRACT

A display panel, a display module, and a display device are provided. The display panel includes a base substrate, a plurality of pixel units, and a liquid crystal layer. A pixel electrode of each pixel unit includes a trunk electrode, and first branch electrodes and second branch electrodes disposed on both sides of the trunk electrode, respectively. Each pixel unit is divided into a first sub-region and a second sub-region by the trunk electrode. The liquid crystal layer includes a first liquid crystal region and a second liquid crystal region corresponding to the first sub-region and the second sub-region.

12 Claims, 14 Drawing Sheets

DISPLAY PANEL COMPRISING A PLURALITY OF PIXEL UNITS DIVIDED INTO ONE FIRST SUB-REGION AND ONE SECOND SUB-REGION BY A TRUNK ELECTRODE, DISPLAY MODULE, AND DISPLAY DEVICE

RELATED APPLICATION

This application claims the benefit of priority of Chinese Patent Application No. 202210901001.8 filed on Jul. 28, 2022, the contents of which are incorporated by reference as if fully set forth herein in their entirety.

FIELD OF INVENTION

The present disclosure relates to the field of display technologies, and more particularly, to a display panel, a display module, and a display device.

BACKGROUND OF INVENTION

In recent years, liquid crystal display panels still occupy a place in the consumer market.

At present, in the liquid crystal display panels, there are dark lines generated by liquid crystal molecules in an area near crossed trunk electrodes, which causes a light transmittance to be low, thereby limiting application scenarios of the liquid crystal display panels.

Therefore, it is necessary to provide a display panel, a display module, and a display device to solve the above technical problems.

SUMMARY OF INVENTION

The present disclosure provides a display panel, a display module, and a display device, which can improve the technical problems of a low light transmittance in current liquid crystal display panels.

The present disclosure provides a display panel, which includes a base substrate, a plurality of pixel units distributed in an array and disposed on the base substrate, and a liquid crystal layer disposed on one side of the pixel units away from the base substrate.

wherein, each of the pixel units includes a pixel electrode, the pixel electrode includes a trunk electrode and branch electrodes electrically connected to the trunk electrode, and the branch electrodes include a plurality of first branch electrodes disposed on one side of the trunk electrode and a plurality of second branch electrodes disposed on another side of the trunk electrode;

each of the pixel units is divided into a first sub-region and a second sub-region by the trunk electrode, the first branch electrodes are located in the first sub-region, the second branch electrodes are located in the second sub-region, extending directions of any two first branch electrodes are parallel to each other, and extending directions of any two second branch electrodes are parallel to each other; and wherein, the liquid crystal layer includes a first liquid crystal region corresponding to the first sub-region and a second liquid crystal region corresponding to the second sub-region.

Preferably, in at least one of the pixel units, an extending direction of the first branch electrodes is parallel to an extending direction of the second branch electrodes.

Preferably, the extending direction of the first branch electrodes is perpendicular to an extending direction of the trunk electrode, and the extending direction of the second branch electrodes is perpendicular to the extending direction of the trunk electrode.

Preferably, an outer contour of each of the pixel units is a rectangle, and the extending direction of the trunk electrode is parallel to a short side of the outer contour of each of the pixel units.

Preferably, in at least one of the pixel units, an area of an orthographic projection of the first branch electrodes on the base substrate is not equal to an area of an orthographic projection of the second branch electrodes on the base substrate.

Preferably, the pixel electrode further includes a first electrode located at an edge of each of the pixel units, and the first electrode is disposed on at least one end of the trunk electrode; and the first electrode is electrically connected to at least one of the branch electrodes, and the first electrode is electrically connected to the trunk electrode.

Preferably, a surface of rotation of a long axis of liquid crystal molecules in the first liquid crystal region is a first plane, and an extending direction of the first branch electrodes is basically parallel to the first plane; and a surface of rotation of the long axis of the liquid crystal molecules in the second liquid crystal region is a second plane, and an extending direction of the second branch electrodes is basically parallel to the second plane.

Preferably, the trunk electrode is located in a third sub-region between the first sub-region and the second sub-region; the liquid crystal layer further includes a third liquid crystal region corresponding to the third sub-region; and wherein, a surface of rotation of the long axis of the liquid crystal molecules in the third liquid crystal region is a third plane, and an extending direction of the trunk electrode is basically parallel to the third plane.

Preferably, the display panel further includes a first polarizer and a second polarizer disposed on both sides of the liquid crystal layer, wherein, an absorption axis of the first polarizer is perpendicular to an absorption axis of the second polarizer; wherein, in a top view of the display panel, an extending direction of the first branch electrodes is perpendicular to an extending direction of the second branch electrodes, and an included angle between the absorption axis of the first polarizer and the extending direction of the first branch electrodes is 45°.

The present disclosure further provides a display module, which includes a compensation display module and at least two display panels mentioned above, wherein, adjacent display panels are spliced along a first direction or a second direction, the at least two display panels include display areas, and the compensation display module is disposed between the display areas.

Preferably, an outer contour of the display module is a rectangle, and an extending direction of the branch electrodes of the at least two display panels is parallel to a short side of the outer contour of the display module.

The present disclosure further provides a display device, which includes the display module mentioned above and a device body, and the device body and the display module are combined into one integrated structure.

Beneficial effects of the present disclosure: in the present disclosure, one pixel unit is divided into two sub-regions by one trunk electrode, the liquid crystal layer is divided into two liquid crystal regions correspondingly, and the branch electrodes in the two sub-regions are set to be in parallel, respectively. A number of trunk electrodes in one pixel unit is reduced, thereby reducing a number of dark lines generated by the liquid crystal molecules near the trunk electrode. Therefore, a light transmittance is improved, and the display effect is also improved.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION OF PREFERRED EMBODIMENTS

Figure 1:
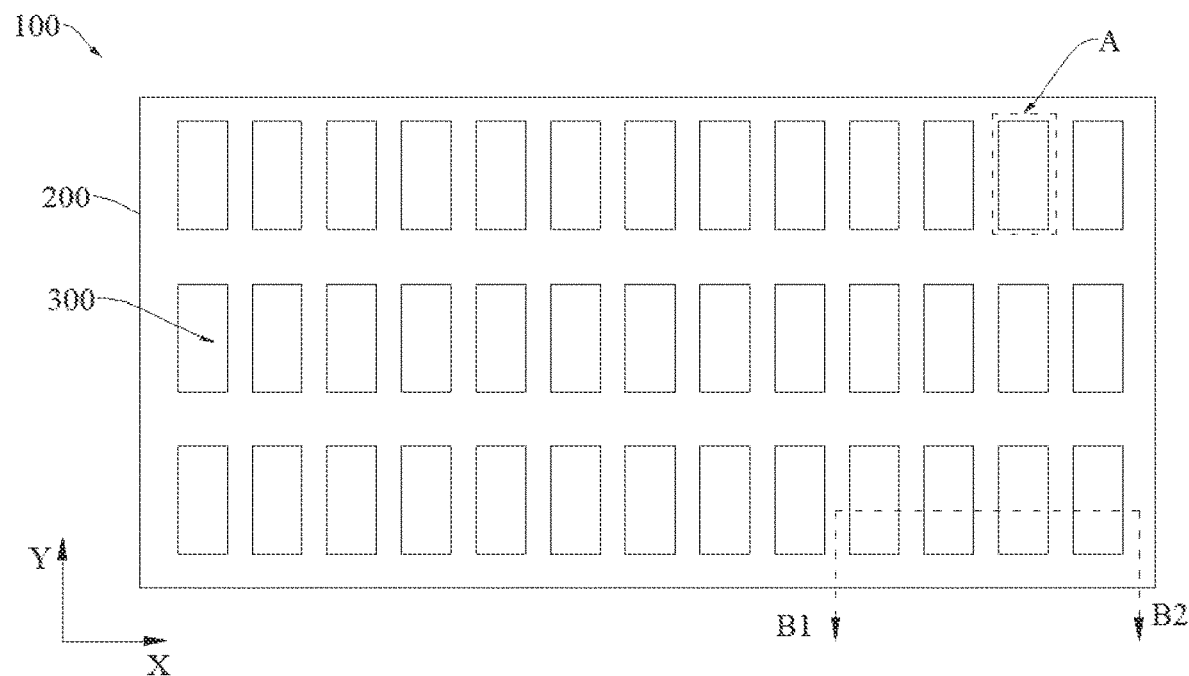
FIG. 1 is a schematic top view of a display panel according to an embodiment of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure. In addition, it should be understood that the specific embodiments described herein are only used to illustrate and explain the disclosure, and are not used to limit the disclosure. In the present disclosure, in the case of no explanation to the contrary, the orientation words used such as "on" and "under" usually refer to upper and lower directions of the device in actual use or working state, and specifically the directions in the drawings; and "inside" and "outside" refer to the outline of the device.

In recent years, liquid crystal display panels still occupy a place in the consumer market.

At present, in the liquid crystal display panels, there are dark lines generated by liquid crystal molecules in an area near crossed trunk electrodes, which causes a light transmittance to be low, thereby limiting application scenarios of the liquid crystal display panels.

Referring to FIGS. 1 to 12, an embodiment of the present disclosure provides a display panel 100, which includes a base substrate 200, a plurality of pixel units 300 distributed in an array and disposed on the base substrate 200, and a liquid crystal layer 400 disposed on one side of the pixel units 300 away from the base substrate 200.

Each of the pixel units 300 includes a pixel electrode 310, the pixel electrode 310 includes a trunk electrode 320 and branch electrodes 330 electrically connected to the trunk electrode 320. The branch electrodes 330 include a plurality of first branch electrodes 331 disposed on one side of the trunk electrode 320 and a plurality of second branch electrodes 332 disposed on another side of the trunk electrode 320.

Each of the pixel units 300 is divided into a first sub-region 301 and a second sub-region 302 by the trunk electrode 320 thereof, the first branch electrodes 331 are located in the first sub-region 301, the second branch electrodes 332 are located in the second sub-region 302, extending directions of any two first branch electrodes 331 are parallel to each other, and extending directions of any two second branch electrodes 332 are parallel to each other.

The liquid crystal layer 400 includes a first liquid crystal region 401 corresponding to the first sub-region 301 and a second liquid crystal region 402 corresponding to the second sub-region 302.

In the present disclosure, one pixel unit 300 is divided into two sub-regions by one trunk electrode 320, the liquid crystal layer 400 is divided into two liquid crystal regions correspondingly, and the branch electrodes 330 in the two sub-regions are set to be in parallel, respectively. A number of trunk electrodes in one pixel unit is reduced, thereby reducing a number of dark lines generated by the liquid crystal molecules near the trunk electrode 320. Therefore, a light transmittance is further improved, and the display effect is also improved.

Specific embodiments are used to describe technical solutions of the present disclosure.

In current technology, for one pixel unit 300, there are two trunk electrodes 320 crossed horizontally and vertically and dividing the pixel unit 300 into four sub-regions, and the liquid crystal layer 400 forms four liquid crystal regions correspondingly. Therefore, the number of dark lines is two, and the dark lines are crossed horizontally and vertically. The two trunk electrodes 320 also have a large influence on liquid crystal molecules 410 corresponding to the branch electrodes, which cause the liquid crystal molecules 410 have difficulties to deflect sometimes, thereby affecting the light transmittance.

Figure 4:
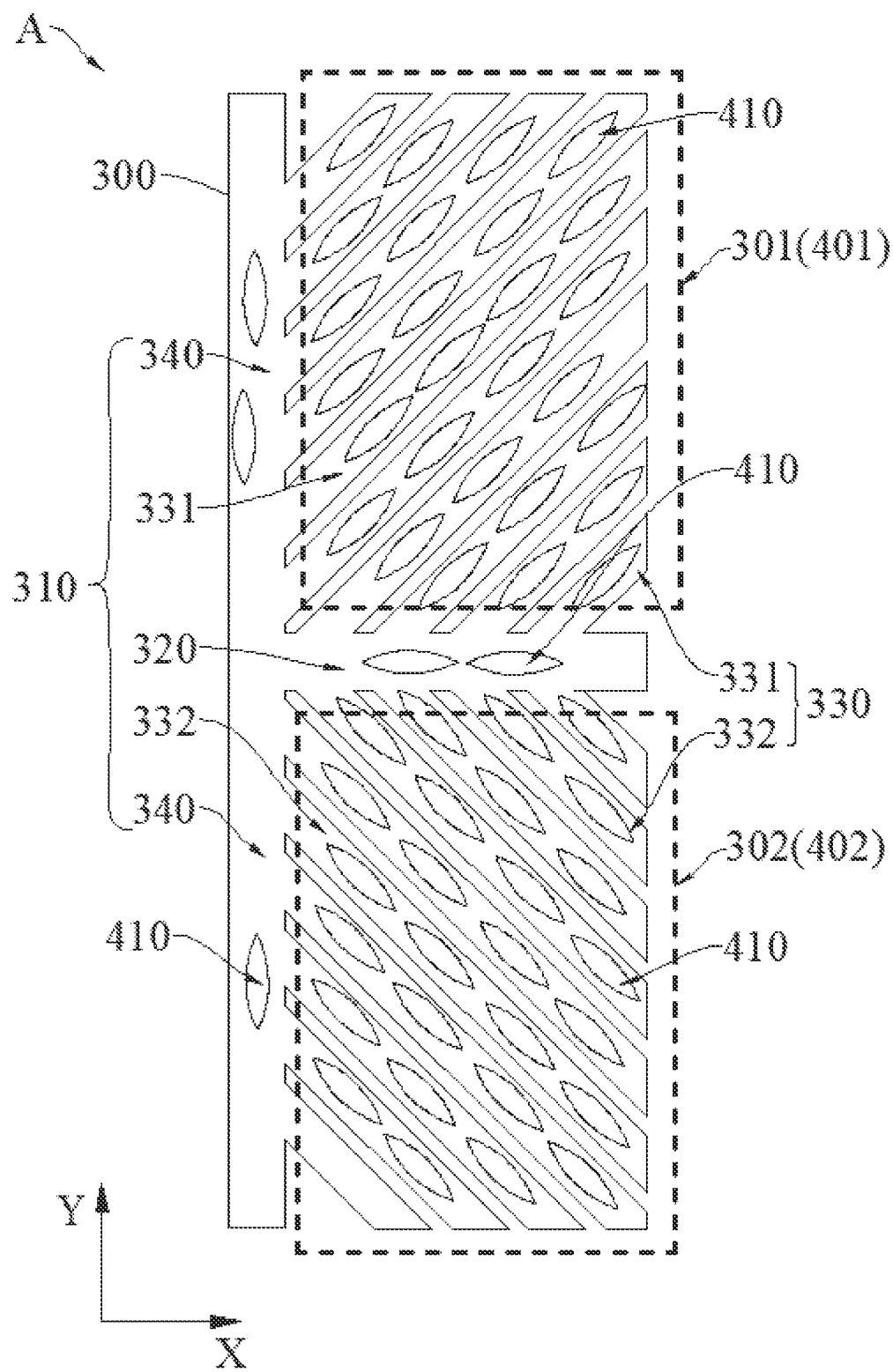
FIG. 4 is a second schematic structural diagram of the area A in FIG. 1.
Figure 7:
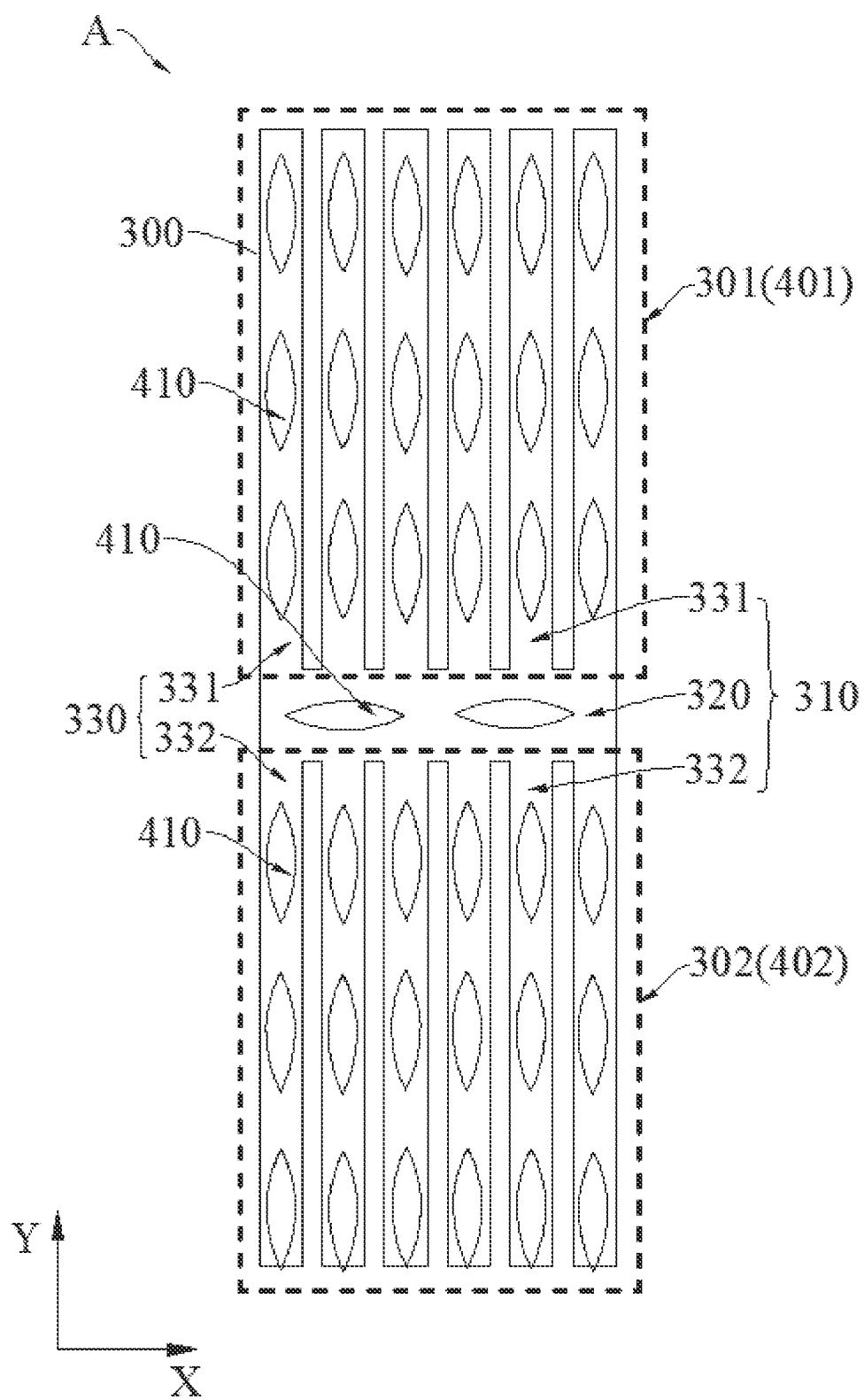
FIG. 7 is a fifth schematic structural diagram of the area A in FIG. 1.
Figure 12:
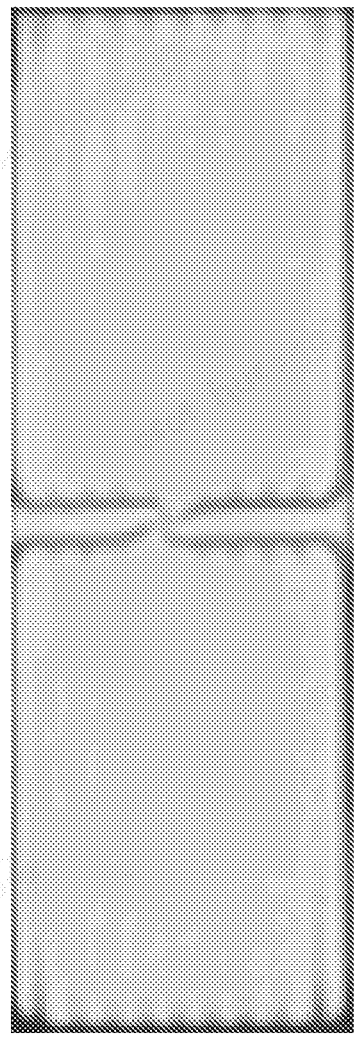
FIG. 12 is a schematic diagram shows a display effect in the area A in FIG. 1.

In some embodiments, referring to FIGS. 4, 7, and 12, the pixel unit 300 is divided into two sub-regions by only one trunk electrode 320, and the liquid crystal layer 400 forms two liquid crystal regions correspondingly, so the number of dark lines is reduced to one, thereby improving the light transmittance, and the number of trunk electrodes 320 is also reduced. In a top view direction of the display panel 100, a long axis of the liquid crystal molecules 410 in the two liquid crystal regions is parallel to corresponding branch electrodes 330.

A surface of rotation of a long axis of the liquid crystal molecules 410 in the first liquid crystal region 401 is a first plane, and an extending direction of the first branch electrodes 331 is basically parallel to the first plane. A surface of rotation of the long axis of the liquid crystal molecules 410 in the second liquid crystal region 402 is a second plane, and an extending direction of the second branch electrodes 332 is basically parallel to the second plane. Since the liquid crystal molecules themselves have fluidity and are easily affected by forces in all directions, there is no absolute parallel relationship, the "basic" parallel relationship is used as a limitation. A deviation range of an included angle within ±5° is considered to be basically parallel, and is explained herein. This structure is more beneficial for the branch electrodes 330 to control the liquid crystal molecules 410, thereby realizing parallel deflection better, and reducing a light influence caused by a non-parallel setting between the branch electrodes 330 and the liquid crystal molecules 410. Therefore, the light transmittance can be further improved, and the display effect is improved.

In the drawings, the Y-axis is a first direction, and the X-axis is a second direction.

In some embodiments, referring to FIGS. 5 to 11, in at least one of the pixel units 300, an extending direction of the first branch electrodes 331 is parallel to an extending direction of the second branch electrodes 332.

The extending direction of the first branch electrodes 331 being parallel to the extending direction of the second branch electrodes 332 can improve consistency of direction of light, thereby being beneficial to improve a viewing angle in a certain direction. This arrangement has advantages for the display panel 100 that needs to improve a viewing angle in a specific direction.

In some embodiments, referring to FIGS. 6, 7, 8, and 11, the extending direction of the first branch electrodes 331 is perpendicular to an extending direction of the trunk electrode 320, and the extending direction of the second branch electrodes 332 is perpendicular to the extending direction of the trunk electrode 320.

Since the extending directions of the first branch electrodes 331 and the second branch electrodes 332 are perpendicular to the extending direction of the trunk electrode 320, in the top view direction of the display panel 100, the long axes of the liquid crystal molecules 410 in the first liquid crystal region 401 and the second liquid crystal region 402 are perpendicular to the trunk electrode 320. Therefore, the influence of the trunk electrode 320 on the liquid crystal molecules 410 in the first liquid crystal region 401 and the second liquid crystal region 402 can be reduced, and control of the liquid crystal molecules 410 by the branch electrodes 330 can be enhanced. Therefore, the light transmittance can be further improved, and the display effect can be improved.

Figure 6:
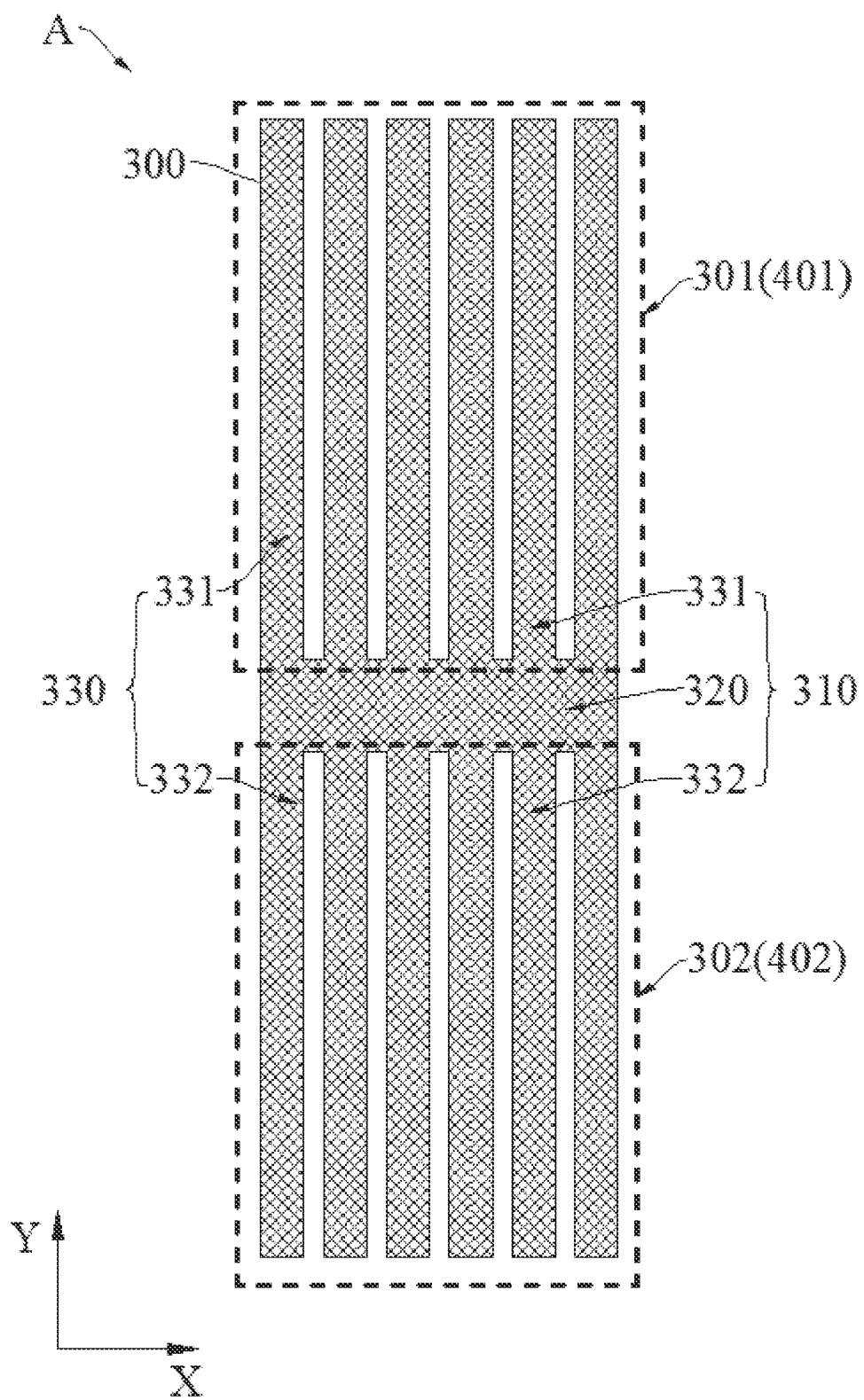
FIG. 6 is a fourth schematic structural diagram of the area A in FIG. 1.

In some embodiments, referring to FIGS. 6 and 7, an outer contour of each of the pixel units 300 is a rectangle, and the extending direction of the trunk electrode 320 is parallel to a short side of the outer contour of each of the pixel units 300.

For a large-sized display panel 100, such as a TV, a range of a horizontal viewing angle is particularly important for display quality. In the large-sized display panel 100, a long side of the pixel units 300 having a rectangular contour is in a vertical direction of the large-sized display panel 100, and the short side of the pixel units 300 having the rectangular contour is in a horizontal direction of the large-sized display panel 100, so the extending direction of the trunk electrode 320 is parallel to the short side of the outer contour of the pixel units 300, and the extending direction of the branch electrodes 330 is parallel to the long side of the outer contour of the pixel units 300. Therefore, in the top view direction of the display panel 100, the long axes of the liquid crystal molecules 410 in the first liquid crystal region 401 and the second liquid crystal region 402 are perpendicular to the horizontal direction of the large-sized display panel 100, and the short axes of the liquid crystal molecules 410 in the first liquid crystal region 401 and the second liquid crystal region 402 are parallel to the horizontal direction of the large-sized display panel 100. When light passes through the short axes, a loss of light is less, thereby improving the viewing angle of light in the horizontal direction of the large-sized display panel 100 and improving the display effect.

In some embodiments, the trunk electrode 320 is located in a third sub-region between the first sub-region 301 and the second sub-region 302. The liquid crystal layer 400 further includes a third liquid crystal region corresponding to the third sub-region. Wherein, a surface of rotation of the long axis of the liquid crystal molecules 410 in the third liquid crystal region is a third plane, and the extending direction of the trunk electrode 320 is basically parallel to the third plane.

Since the liquid crystal molecules themselves have fluidity and are easily affected by forces in all directions, there is no absolute parallel relationship, the "basic" parallel relationship is used as a limitation. A deviation range of an included angle within ±5° is considered to be basically parallel, and is explained herein. In the figures, the third sub-region and the third liquid crystal region are easy to understand, which are respectively located between the first sub-region 301 and the second sub-region 302 and between the first liquid crystal region 401 and the second liquid crystal region 402, so there is no labeling. In the top view direction of the display panel 100, a long axis of the liquid crystal molecules 410 in the third liquid crystal region is parallel to the trunk electrode 320, so the liquid crystal molecules 410 located in the third liquid crystal region can reduce the number of dark lines in a certain extent, thereby improving the light transmittance, increasing the display brightness, and improving the display effect.

In some embodiments, referring to FIGS. 3, 4, 5, 9, and 10, the extending direction of the first branch electrodes 331 is not perpendicular to the extending direction of the trunk electrode 320, and the extending direction of the second branch electrodes 332 is not perpendicular to the extending direction of the trunk electrode 320.

Therefore, an angle of the liquid crystal molecules 410 near the trunk electrode 320 can be increased, thereby reducing the dark lines in a certain extent, improving the light transmittance, increasing the display brightness, and improving the display effect.

Figure 10:
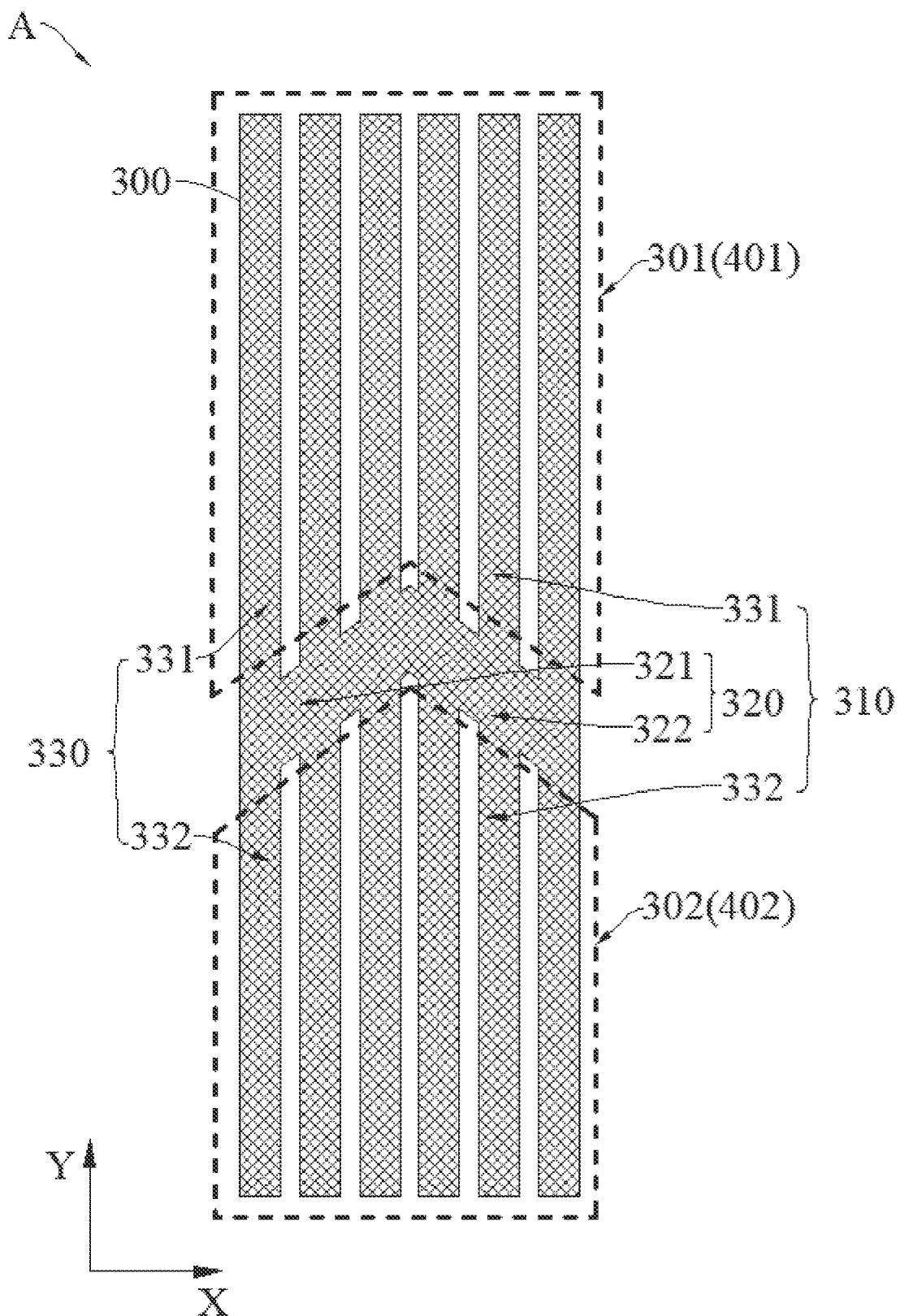
FIG. 10 is an eighth schematic structural diagram of the area A in FIG. 1.

In some embodiments, referring to FIG. 10, the trunk electrode 320 includes at least a first part 321 and a second part 322, and an extending direction of the first part 321 is different from an extending direction of the second part 322. Therefore, the angle of the liquid crystal molecules 410 near the trunk electrode 320 can be increased, thereby further reducing the dark lines, improving the light transmittance, increasing the display brightness, and improving the display effect.

Figure 8:
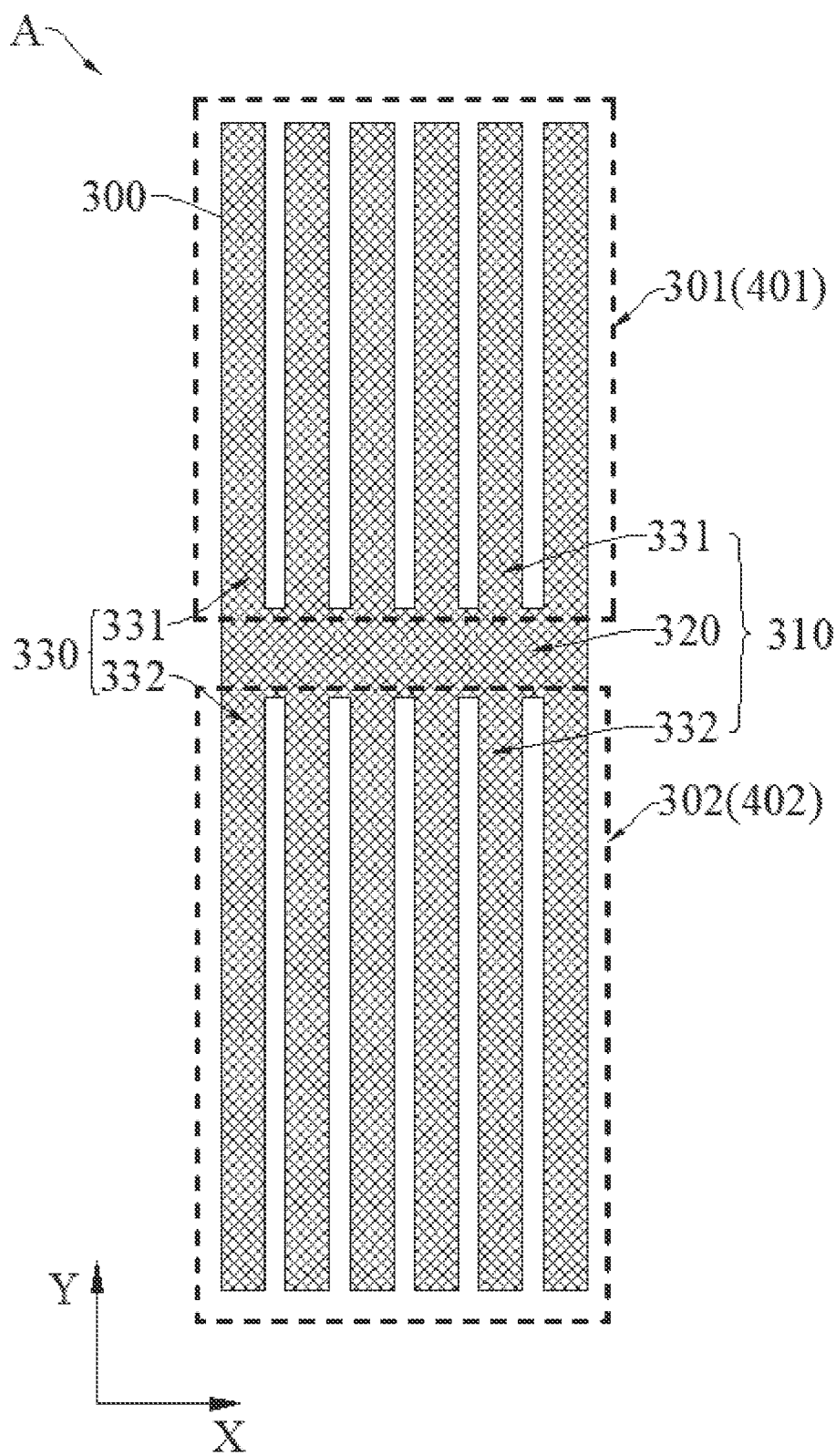
FIG. 8 is a sixth schematic structural diagram of the area A in FIG. 1.
Figure 9:
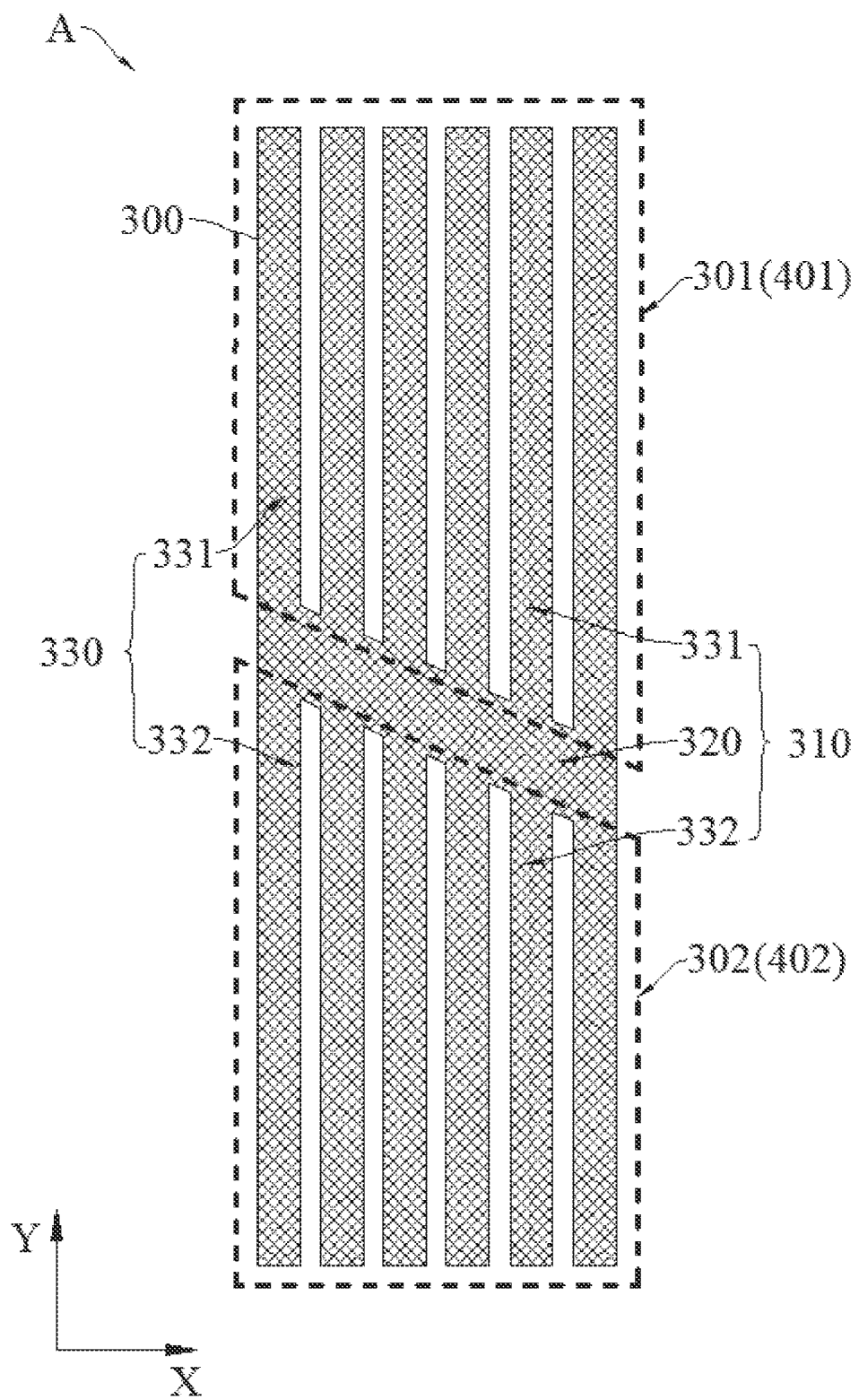
FIG. 9 is a seventh schematic structural diagram of the area A in FIG. 1.

In some embodiments, referring to FIG. 8, in at least one of the pixel units 300, an area of an orthographic projection of the first branch electrodes 331 on the base substrate 200 is not equal to an area of an orthographic projection of the second branch electrodes 332 on the base substrate 200.

By moving a position of the trunk electrode 320, the first sub-region 301 and the second sub-region 302 having unequal areas can be obtained. Therefore, a diversity of viewing angles of display can be further improved, a display viewing angle can be increased, and the display effect can be improved.

In some embodiments, referring to FIGS. 3, 4, 5, and 11, the pixel electrode 310 further includes a first electrode 340 located at an edge of the pixel unit 300, and the first electrode 340 is disposed on at least one end of the trunk electrode 320. Wherein, the first electrode 340 is electrically connected to at least one of the branch electrodes 330, and the first electrode 340 is electrically connected to the trunk electrode 320.

The first electrode 340 on the edge electrically connects the branch electrodes 330 to the trunk electrode 320 and provides better electrical stability to the branch electrodes 330, thereby enhancing the control to the liquid crystal molecules 410, and therefore, the light transmittance can be improved, the display brightness can be increased, and the display effect can be improved.

Figure 5:
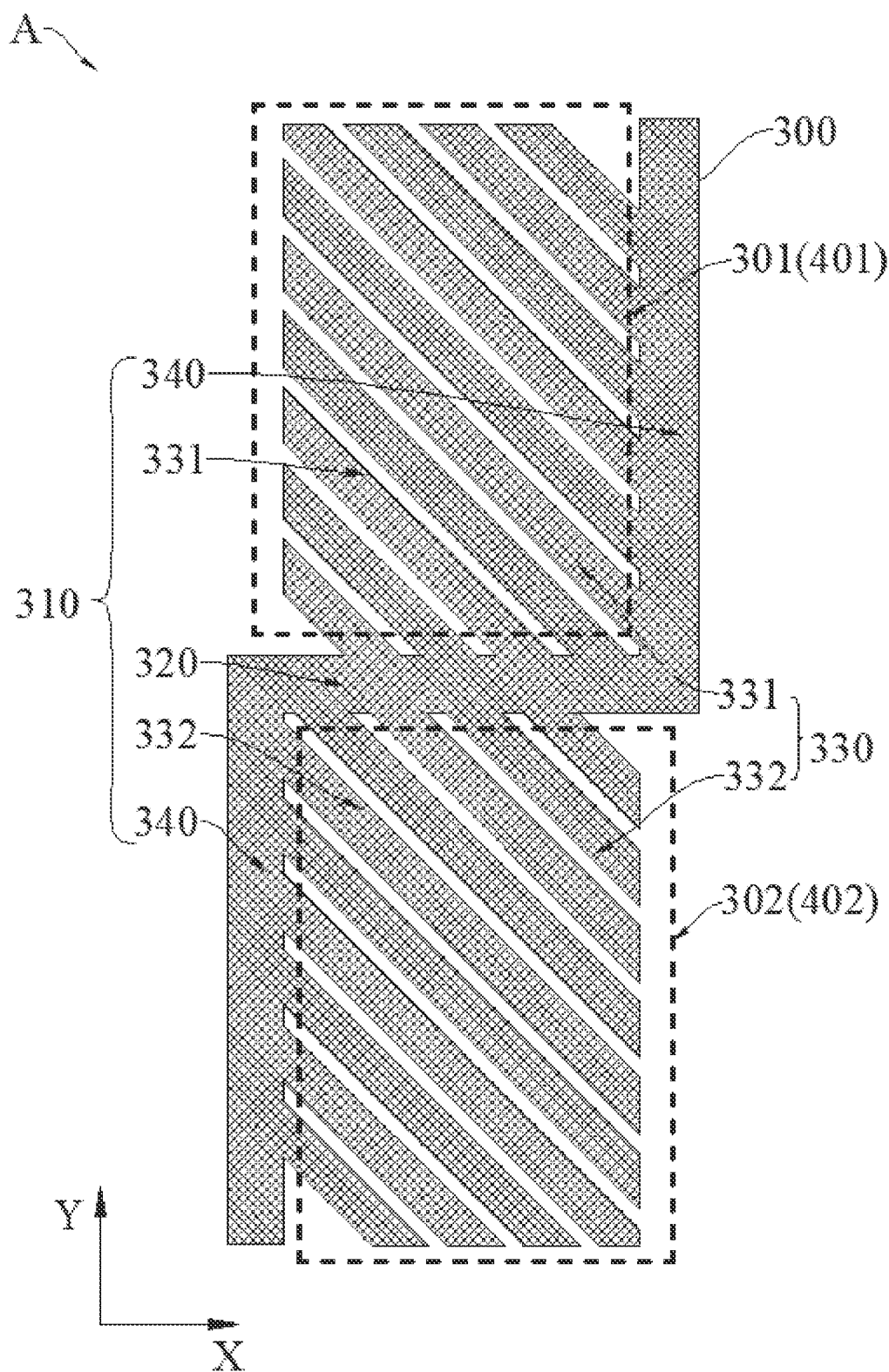
FIG. 5 is a third schematic structural diagram of the area A in FIG. 1.
Figure 11:
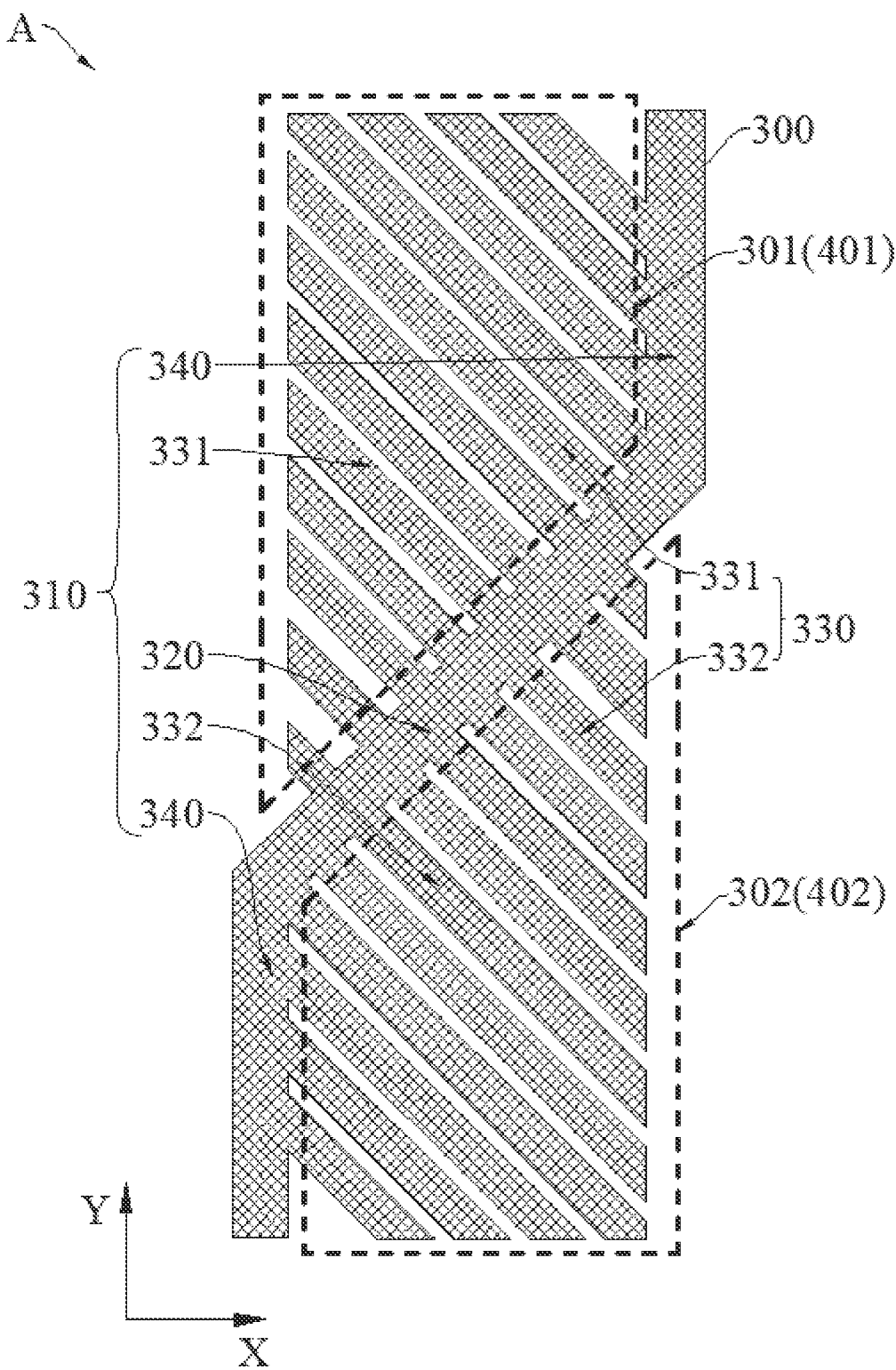
FIG. 11 is a ninth schematic structural diagram of the area A in FIG. 1.

In some embodiments, referring to FIGS. 5 and 11, in at least one of the pixel units 300, two first electrodes 340 are disposed on both ends of the trunk electrode 320, respectively.

In some embodiments, in at least one of the pixel units 300, two first electrodes 340 are disposed on both ends of the trunk electrode 320, respectively, and a length of the first electrodes 340 is equal to a length of a long side of a contour of the pixel units 300.

Therefore, better electrical stability can be provided to the branch electrodes 330, thereby enhancing the control to the liquid crystal molecules 410, and therefore, the light transmittance can be improved, the display brightness can be increased, and the display effect can be improved.

In some embodiments, the display panel 100 further includes a first polarizer (not shown in the figures) and a second polarizer (not shown in the figures) disposed on both sides of the liquid crystal layer 400, wherein, an absorption axis of the first polarizer is perpendicular to an absorption axis of the second polarizer. Wherein, in a top view of the display panel 100, an extending direction of the first branch electrodes 331 is perpendicular to an extending direction of the second branch electrodes 332, and an included angle between the absorption axis of the first polarizer and the extending direction of the first branch electrodes 331 is 45°.

The included angle between the absorption axis of the polarizers and the branch electrodes 330 needs to be 45°, so in the top view direction of the display panel 100, an included angle between the absorption axis of the polarizers and the long axis of the liquid crystal molecules 410 can be 45°, thereby ensuring normal display. For example, referring to FIG. 7, in the top view direction of the display panel 100, when the long axis of the liquid crystal molecules 410 is parallel to the Y axis, included angles between the absorption axes of the first polarizer and the second polarizer and a positive direction of the Y axis in a counterclockwise direction may be 45° and 135°, respectively.

In some embodiments, the base substrate 200 includes a substrate and a driving circuit layer. The driving circuit layer includes an active layer disposed on the substrate, a first insulating layer disposed on the active layer, a gate electrode layer disposed on the first insulating layer, a second insulating layer disposed on the gate electrode layer, a source and drain electrode layer disposed on the second insulating layer, and a third insulating layer disposed on the source and drain electrode layer.

Figure 2:
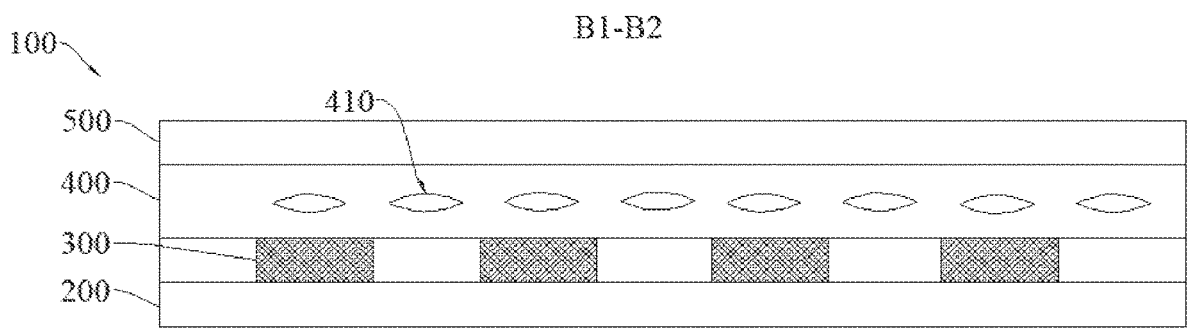
FIG. 2 is a schematic structural diagram of the display panel along a cross-section B1-B2 in FIG. 1.
Figure 3:
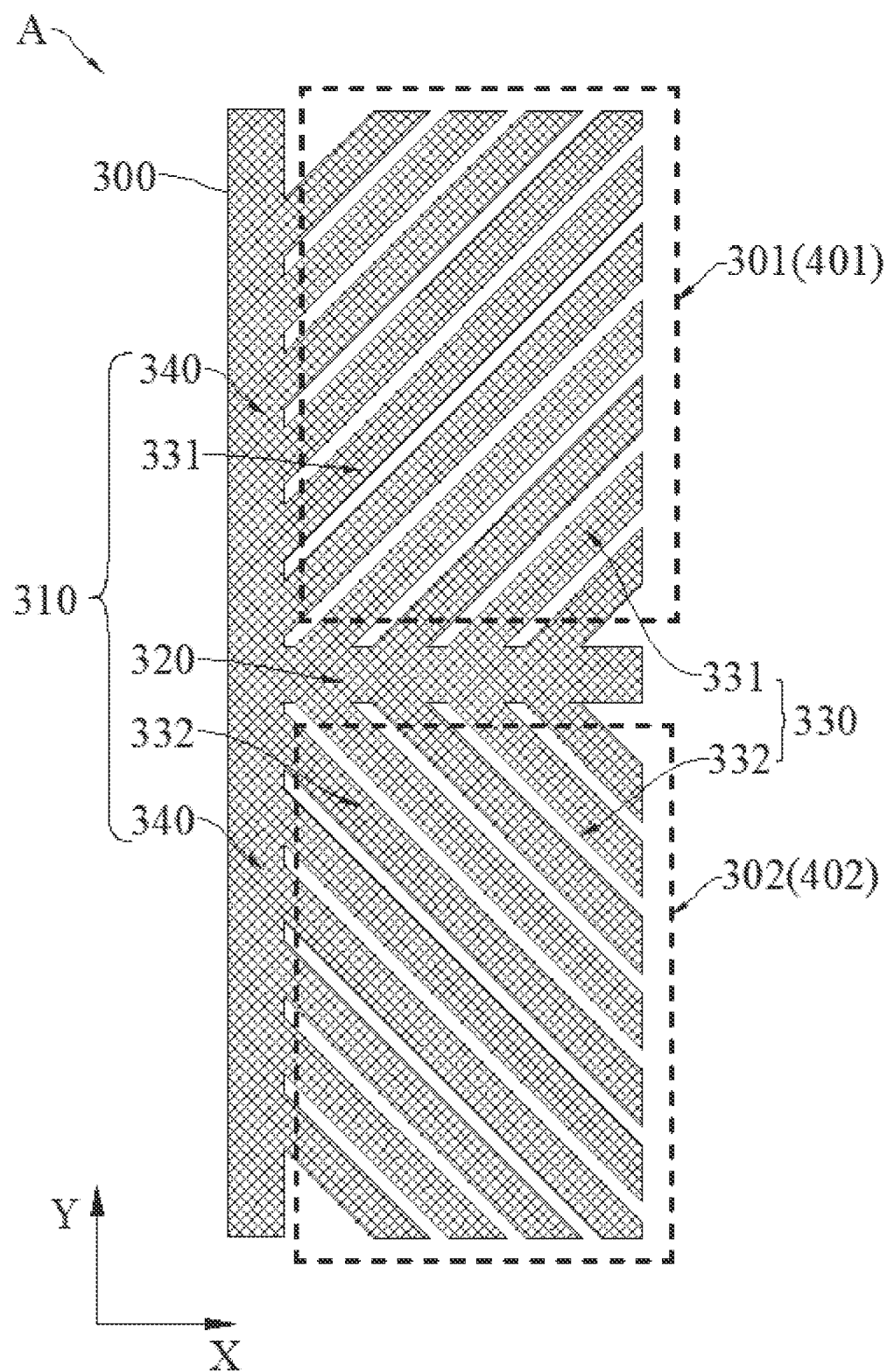
FIG. 3 is a first schematic structural diagram of an area A in FIG. 1.

In some embodiments, referring to FIG. 2, the display panel 100 further includes a color filter layer 500 disposed on one side of the liquid crystal layer 400 away from the base substrate 200.

In some embodiments, the color filter layer 500 includes a plurality of color resists and light-shielding units located between adjacent color resists, and colors of the plurality of color resists include red, blue, and green.

In the present disclosure, one pixel unit 300 is divided into two sub-regions by one trunk electrode 320, the liquid crystal layer 400 is divided into two liquid crystal regions correspondingly, and the branch electrodes 330 in the two sub-regions are set to be in parallel, respectively. The number of trunk electrodes in one pixel unit is reduced, thereby reducing the number of dark lines generated by the liquid crystal molecules near the trunk electrode 320. Therefore, the light transmittance is improved. A plane where the deflected direction of the long axis of the liquid crystal molecules 410 is set to be parallel to the extending direction of corresponding branch electrodes 330, thereby further improving the control of the branch electrodes 330 to the liquid crystal molecules 410 and reducing the influence of crisscross trunk electrodes on deflection of the liquid crystal molecules. Meanwhile, the light influence caused by the non-parallel setting between the branch electrodes 330 and the liquid crystal molecules 410 can be reduced. Therefore, the light transmittance can be further improved, and the display effect is improved.

Figure 13:
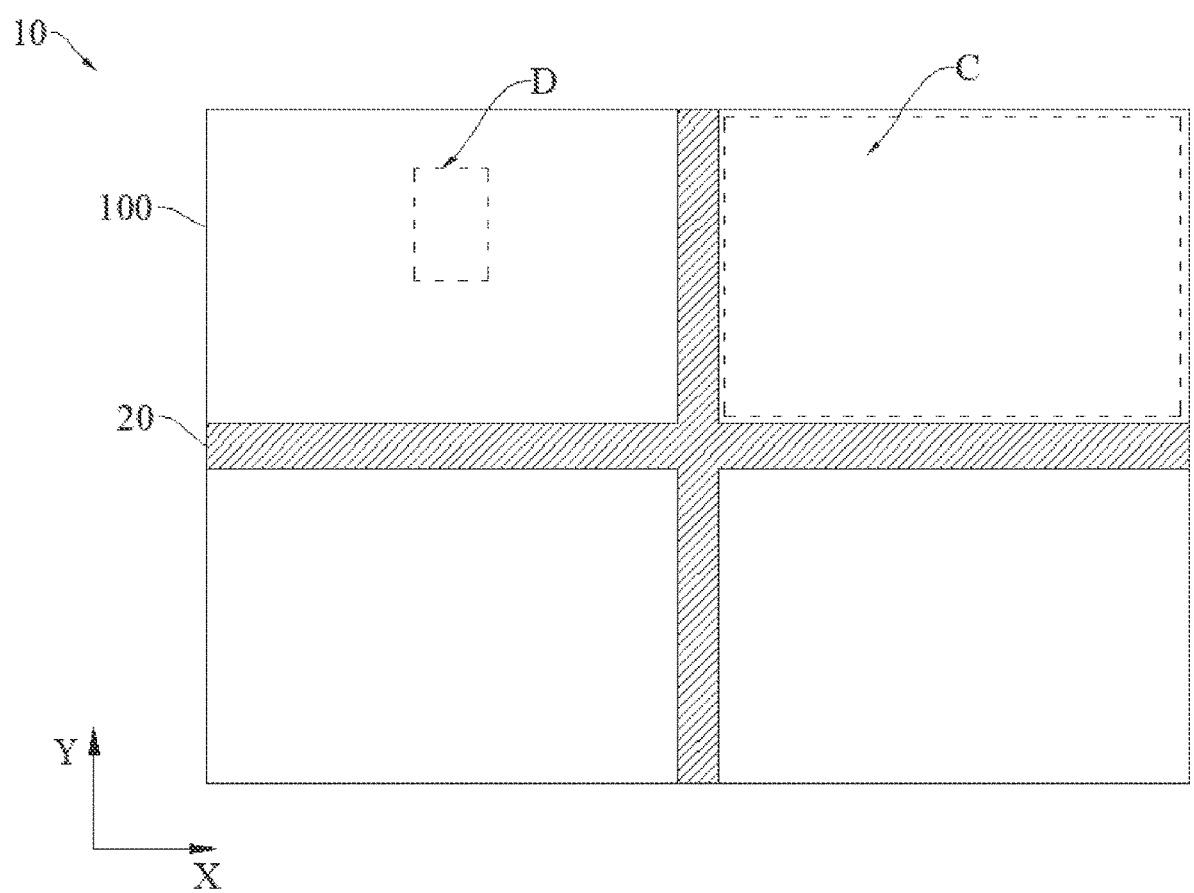
FIG. 13 is a schematic structural diagram of a display module according to an embodiment of the present disclosure.

Referring to FIG. 13, an embodiment of the present disclosure further provides a display module 10, which includes a compensation display module 20 and at least two display panels 100 mentioned above, wherein, adjacent display panels 100 are spliced along the first direction or the second direction, the at least two display panels 100 include display areas C, and the compensation display module 20 is disposed between the display areas C.

In the present disclosure, one pixel unit 300 is divided into two sub-regions by one trunk electrode 320, the liquid crystal layer 400 is divided into two liquid crystal regions correspondingly, and the branch electrodes 330 in the two sub-regions are set to be in parallel, respectively. The number of trunk electrodes in one pixel unit is reduced, thereby reducing the number of dark lines generated by the liquid crystal molecules near the trunk electrode 320. Therefore, the light transmittance is improved. The plane where the deflected direction of the long axis of the liquid crystal molecules 410 is set to be parallel to the extending direction of corresponding branch electrodes 330, thereby further improving the control of the branch electrodes 330 to the liquid crystal molecules 410 and reducing the influence of crisscross trunk electrodes on deflection of the liquid crystal molecules. Meanwhile, the light influence caused by the non-parallel setting between the branch electrodes 330 and the liquid crystal molecules 410 can be reduced. Therefore, the light transmittance can be further improved, and the display effect is improved.

Specific embodiments are used to describe technical solutions of the present disclosure.

In the drawings, the Y-axis is the first direction, and the X-axis is the second direction.

In some embodiments, referring to FIG. 13, the first direction is perpendicular to the second direction.

In some embodiments, the compensation display module 20 includes a plurality of light-emitting chips, and light-emitting colors of the plurality of light-emitting chips include red, green, and blue. The compensation display module 20 is a self-luminous direct display, which makes up for splicing gaps of the display module 10 and improves the display effect.

In some embodiments, the light-emitting chips may be micro-LEDs or mini-LEDs, which are not specifically limited herein.

Figure 14:
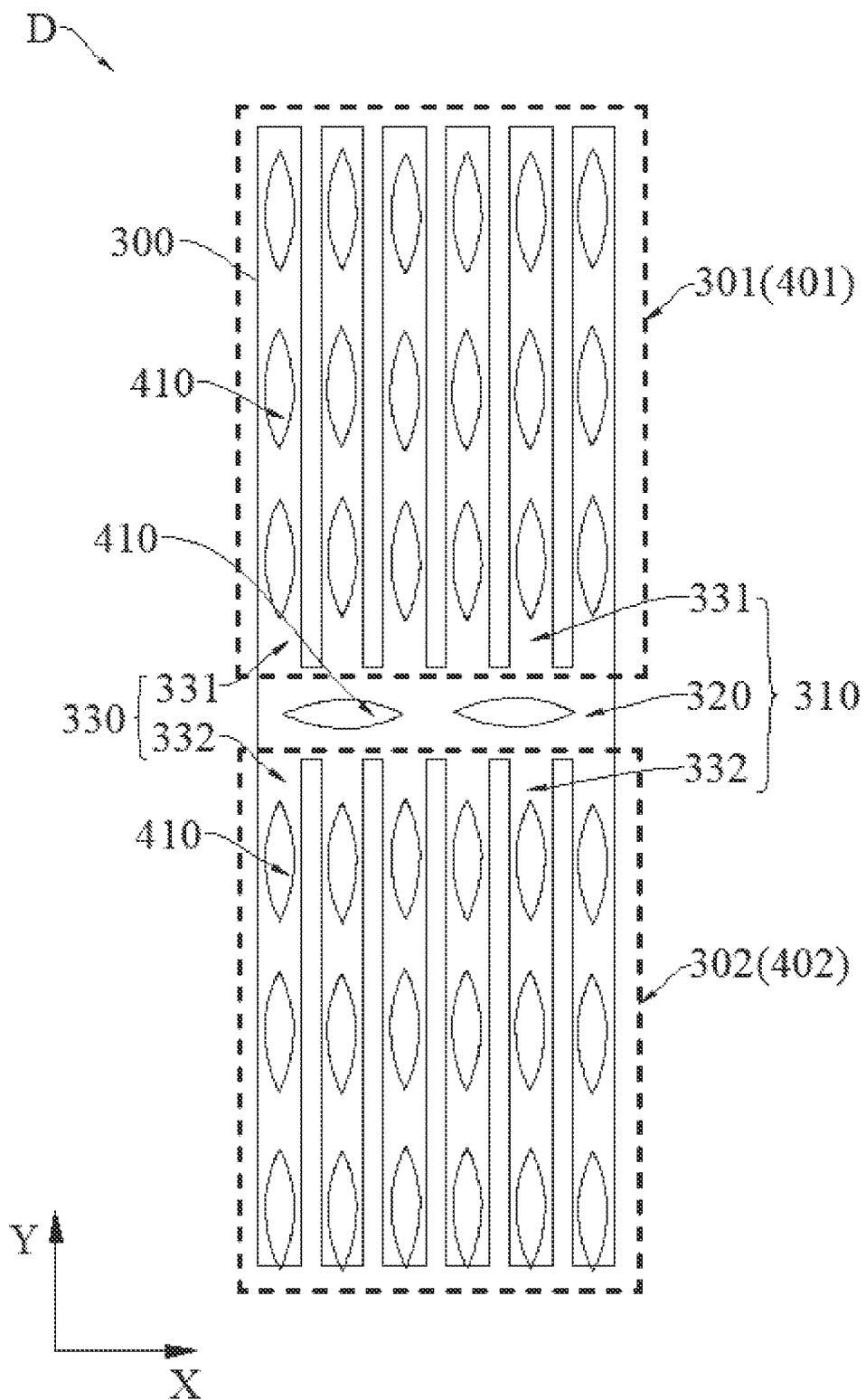
FIG. 14 is a schematic structural diagram of an area D in FIG. 13.

In some embodiments, referring to FIG. 14, an outer contour of the display module 10 is a rectangle, and an extending direction of the branch electrodes 330 of the at least two display panels 100 is parallel to a short side of the outer contour of the display module 10.

The display module 10 is a large-sized spliced display screen, For a large-sized display module 10, such as a TV, users are primarily concerned with horizontal viewing angles, and a range of the horizontal viewing angles is particularly important for display quality. The long side of the pixel units 300 having the rectangular contour is in a vertical direction of the large-sized display module 10, and the short side of the pixel units 300 having the rectangular contour is in a horizontal direction of the large-sized display module 10, so the extending direction of the trunk electrode 320 is parallel to the short side of the outer contour of the display module 10, and the extending direction of the branch electrodes 330 is parallel to the long side of the outer contour of the display module 10. Therefore, in the top view direction of the display module 10, the long axes of the liquid crystal molecules 410 in the first liquid crystal region 401 and the second liquid crystal region 402 are perpendicular to the horizontal direction of the large-sized display module 10, and the short axes of the liquid crystal molecules 410 in the first liquid crystal region 401 and the second liquid crystal region 402 are parallel to the horizontal direction of the large-sized display module 10. When light passes through the short axes, a loss of light is less, thereby improving the viewing angle of light in the horizontal direction of the large-sized display module 10 and improving the display effect.

In the present disclosure, one pixel unit 300 is divided into two sub-regions by one trunk electrode 320, the liquid crystal layer 400 is divided into two liquid crystal regions correspondingly, and the branch electrodes 330 in the two sub-regions are set to be in parallel, respectively. The number of trunk electrodes in one pixel unit is reduced, thereby reducing the number of dark lines generated by the liquid crystal molecules near the trunk electrode 320. Therefore, the light transmittance is further improved, and the display effect is also improved.

Figure 15:
FIG. 15 is a schematic structural diagram of a display device according to an embodiment of the present disclosure.

Referring to FIG. 15, an embodiment of the present disclosure further provides a display device 1, which includes the display module 10 mentioned above and a device body 2, and the device body 2 and the display module 10 are combined into one integrated structure.

A specific structure of the display module 10 can be referred to any one of the embodiments of the display module 10 and the drawings, and will not be repeated herein.

In this embodiment, the device body 2 may include a middle frame, a sealant, etc., and the display device 1 may be a display terminal, such as a TV or a giant screen, which is not limited herein.

The embodiments of the present disclosure provide the display panel, the display module, and the display device. The display panel includes the base substrate, the plurality of pixel units, and the liquid crystal layer. The pixel electrode of each pixel unit includes the trunk electrode, and the first branch electrodes and the second branch electrodes disposed on both sides of the trunk electrode, respectively. Each pixel unit is divided into the first sub-region and the second sub-region by the trunk electrode. The liquid crystal layer includes the first liquid crystal region and the second liquid crystal region corresponding to the first sub-region and the second sub-region. By dividing each pixel unit into two sub-regions by the trunk electrode and arranging branch electrodes in the two sub-regions to be in parallel, respectively, the number of dark lines can be reduced, thereby further improving the light transmittance and improving display effect.

The display panel, the display module, and the display device provided by the embodiments of the present disclosure are described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A display panel, comprising a base substrate, a plurality of pixel units distributed in an array and disposed on the base substrate, and a liquid crystal layer disposed on one side of the pixel units away from the base substrate;
   wherein each of the pixel units comprises one pixel electrode, the pixel electrode comprises one trunk electrode and branch electrodes electrically connected to the trunk electrode, and the branch electrodes comprise a plurality of first branch electrodes disposed on one side of the trunk electrode and a plurality of second branch electrodes disposed on another side of the trunk electrode;
   each of the pixel units is divided into one first sub-region and one second sub-region by the trunk electrode, the first branch electrodes are located in the first sub-region, the second branch electrodes are located in the second sub-region, extending directions of any two first branch electrodes are parallel to each other, and extending directions of any two second branch electrodes are parallel to each other; and
   wherein the liquid crystal layer comprises a first liquid crystal region corresponding to the first sub-region and a second liquid crystal region corresponding to the second sub-region;
   wherein an outer contour of each of the pixel units is a rectangle, and the extending direction of the trunk electrode is parallel to a short side of the outer contour of each of the pixel units.

2. The display panel according to claim 1, wherein in at least one of the pixel units, an extending direction of the first branch electrodes is parallel to an extending direction of the second branch electrodes.

3. The display panel according to claim 2, wherein the extending direction of the first branch electrodes is perpendicular to an extending direction of the trunk electrode, and the extending direction of the second branch electrodes is perpendicular to the extending direction of the trunk electrode.

4. The display panel according to claim 3, wherein an outer contour of each of the pixel units is a rectangle, and the extending direction of the trunk electrode is parallel to a short side of the outer contour of each of the pixel units.

5. The display panel according to claim 2, wherein in at least one of the pixel units, an area of an orthographic projection of the first branch electrodes on the base substrate is not equal to an area of an orthographic projection of the second branch electrodes on the base substrate.

6. The display panel according to claim 2, wherein the pixel electrode further comprises a first electrode located at an edge of each of the pixel units, and the first electrode is disposed on at least one end of the trunk electrode; and the first electrode is electrically connected to at least one of the branch electrodes, and the first electrode is electrically connected to the trunk electrode.

7. The display panel according to claim 1, wherein a surface of rotation of a long axis of liquid crystal molecules in the first liquid crystal region is a first plane, and an extending direction of the first branch electrodes is basically parallel to the first plane; and a surface of rotation of the long axis of the liquid crystal molecules in the second liquid crystal region is a second plane, and an extending direction of the second branch electrodes is basically parallel to the second plane.

8. The display panel according to claim 7, wherein the trunk electrode is located in a third sub-region between the first sub-region and the second sub-region;

the liquid crystal layer further comprises a third liquid crystal region corresponding to the third sub-region; and wherein a surface of rotation of the long axis of the liquid crystal molecules in the third liquid crystal region is a third plane, and an extending direction of the trunk electrode is basically parallel to the third plane.

9. The display panel according to claim 1, further comprising a first polarizer and a second polarizer disposed on both sides of the liquid crystal layer, wherein an absorption axis of the first polarizer is perpendicular to an absorption axis of the second polarizer;

wherein in a top view of the display panel, an extending direction of the first branch electrodes is perpendicular to an extending direction of the second branch electrodes, and an included angle between the absorption axis of the first polarizer and the extending direction of the first branch electrodes is 45°.

10. A display module, comprising a compensation display module and at least two display panels according to claim 1, wherein adjacent display panels are spliced along a first direction or a second direction, the at least two display panels comprise display areas, and the compensation display module is disposed between the display areas.

11. The display module according to claim 10, wherein an outer contour of the display module is a rectangle, and an extending direction of the branch electrodes of the at least two display panels is parallel to a short side of the outer contour of the display module.

12. A display device, comprising the display module according to claim 10 and a device body, wherein the device body and the display module are combined into one integrated structure.

* * * * *